United States Patent
Liedtke

(10) Patent No.: US 6,695,017 B1
(45) Date of Patent: Feb. 24, 2004

(54) METHOD AND APPARATUS FOR FILLING A PRESSURE TANK WITH A FLUID

(75) Inventor: Björn Liedtke, München (DE)

(73) Assignee: Steag Hamatech AG (DE)

( * ) Notice: Subject to any disclaimer, the term of this patent is extended or adjusted under 35 U.S.C. 154(b) by 0 days.

(21) Appl. No.: 09/958,068

(22) PCT Filed: Mar. 11, 2000

(86) PCT No.: PCT/EP00/02156

§ 371 (c)(1),
(2), (4) Date: Jan. 9, 2002

(87) PCT Pub. No.: WO00/58019

PCT Pub. Date: Oct. 5, 2000

(30) Foreign Application Priority Data

Mar. 29, 1999 (DE) .......................... 199 14 202

(51) Int. Cl.⁷ .................... B65B 31/00; B67C 3/00
(52) U.S. Cl. .................... 141/5; 141/4; 141/39; 141/40; 141/95; 141/198; 141/302
(58) Field of Search .............. 141/4–6, 18, 21, 141/39, 40, 94, 95, 192, 198, 285, 302

(56) References Cited

U.S. PATENT DOCUMENTS

| | | | | |
|---|---|---|---|---|
| 3,893,625 A | * | 7/1975 | Wiggins | |
| 4,313,475 A | * | 2/1982 | Wiggins | |
| 4,413,752 A | * | 11/1983 | McMillin et al. | |
| 4,450,981 A | * | 5/1984 | Haig | |
| 4,676,404 A | * | 6/1987 | Yamazaki et al. | |
| 5,373,702 A | * | 12/1994 | Kalet et al. | 62/50.2 |
| 5,454,408 A | * | 10/1995 | DiBella et al. | 141/197 |
| 5,582,218 A | * | 12/1996 | Beale | 141/3 |
| 5,636,762 A | * | 6/1997 | Juhola et al. | |
| 6,044,647 A | * | 4/2000 | Drube et al. | 62/50.1 |

FOREIGN PATENT DOCUMENTS

| | | | |
|---|---|---|---|
| DE | 25 48 672 | * | 9/1976 |
| DE | 3346330 A1 | * | 7/1985 |
| DE | 4215841 A1 | * | 11/1993 |

* cited by examiner

*Primary Examiner*—Timothy L. Maust
(74) *Attorney, Agent, or Firm*—R W Becker & Associates; R W Becker

(57) ABSTRACT

To enable filling a pressure tank with a fluid without having to interrupt the use of the pressure tank, a method is provided for filling a pressure tank with a fluid from a refill tank that is disposed higher, whereby the tanks are interconnected via a gas connecting line and a fluid feed line. The method includes the regulation of the pressure in the pressure tank via a proportional valve disposed in a gas inlet line of the pressure tank, while the connecting lines to the refill tank are closed, the adjustment of the pressure in the refill tank to the pressure in the pressure tank, and the opening of the connecting lines between the refill tank and the pressure tank. Furthermore, an apparatus for carrying out the above method is provided.

13 Claims, 3 Drawing Sheets

METHOD AND APPARATUS FOR FILLING A PRESSURE TANK WITH A FLUID

BACKGROUND OF THE INVENTION

The present invention relates to a method and an apparatus for filling a pressure tank with a fluid.

Such methods and apparatus are known, for example, in systems for coating substrates, such as CDs.

With these systems, a lacquer that is disposed in a pressure tank is moved via a riser to a coating station by the pressure that is in the pressure tank. At the coating station, the lacquer is applied to the CDs that are to be coated by means of an outlet or discharge valve. In this connection, for a uniform and continuous coating of these CDs it is important that the pressure of the lacquer that is to be dispensed at the outlet valve preferably have a constant predetermined value.

With the heretofore known systems, however, such a uniform and continuous coating of these CDs was not possible during the filling or refilling of the pressure tank with lacquer, so that the coating process had to be interrupted during the refilling process. During the filling or refilling of the pressure tank with lacquer, the pressure tank was relieved to ambient pressure and the lacquer was then introduced into the tank via a fill opening. However, with this procedure undesired interruptions of the coating processes, as well as a high consumption of nitrogen, which is generally utilized, resulted in order to again bring the pressure tank to the desired pressure after the filling process.

It is therefore an object of the present invention to enable filling of a pressure tank with a fluid without the necessity for interrupting the use of the pressure tank.

SUMMARY OF THE INVENTION

The stated object is inventively realized by a method for filling a pressure tank with a fluid from a refill tank that is disposed higher, whereby the tanks are interconnected by a gas connecting line and a fluid feed line, by regulating or adjusting the pressure in the pressure tank via a proportional valve that is disposed in a gas inlet line of the pressure tank, while the connecting lines to the refill tank are closed, by adjusting the pressure in the refill tank to the pressure in the pressure tank, and by opening the connecting line between refill tank and the pressure tank. By adjusting the pressure in the refill tank to the pressure in the pressure tank it is possible to fill the pressure tank with fluid without having to first relieve the pressure. Furthermore, the pressure conditions within the pressure tank are not changed by the filling process, since the same pressure exists in both tanks, so that the function and the use of the pressure tank are not adversely affected. Since the refill tank is disposed higher than the pressure tank, there is a hydrostatic pressure difference that causes the fluid to run into the pressure tank without thereby changing the gas pressure within the pressure tank.

Pursuant to a preferred specific embodiment of the present invention, the gas inlet line between the proportional valve and the pressure tank is closed prior to adjusting the pressure in the refill tank, and the regulation or adjustment of the pressure in the refill tank is effected via the same proportional valve that is used for regulating the pressure in the pressure tank. This results in the advantage that for the regulation of the pressure in the refill tank the same components are used as for the regulation of the pressure tank without thereby adversely affecting the pressure in the pressure tank. Although a readjustment of the pressure in the pressure tank is not possible during the regulation of the pressure in the refill tank, a critical pressure change within the pressure tank that limits the function of the pressure tank lasts longer than does the adjustment of the pressure in the refill tank to the pressure in the pressure tank. After reaching the same pressure in the refill tank, the gas inlet line can again be opened, so that no adverse impact upon the system occurs as a result of the brief closing.

The pressure in the pressure tank is advantageously adjusted to a desired pressure value that is determined as a function of measurement results of a first pressure sensor that is disposed in an outlet line of the pressure tank, in order to achieve an automatic adaptation of the system to variable disturbance factors, such as the filling height of the fluid in the tank as well as filter pressure losses of a filter that is typically disposed in the outlet line. In this connection, the desired pressure value is advantageously not altered as long as the gas inlet line between the proportional valve and the pressure tank is closed, since a readjustment of the pressure in the pressure tank at this point in time is not possible, and a change of the desired pressure value would lead to adjustment of the refill tank to a pressure that is different than that of the pressure tank. This would lead to undesired pressure fluctuations or changes when the connecting line between the refill tank and the pressure tank is opened.

The pressure in the gas inlet line is advantageously measured in order to provide the actual pressure that is required for a regulation of the pressure in the pressure tank or of the pressure in the refill tank. The measurement of the actual pressure in the gas inlet line has the advantage that the same pressure sensor is used for the pressure tank as well as for the refill tank, as a result of which a greater precision can be achieved and the cost for an additional pressure sensor can be saved. Furthermore no dynamic line and/or filter pressure losses occur in the gas inlet line, so that a stable regulation condition of the proportional valve is achieved without fluctuations.

Pursuant to a further, preferred specific embodiment of the invention, the desired pressure value is determined as a function of a differential pressure sensor as long as the connecting lines between the refill tank and the pressure tank are opened; this differential pressure sensor is disposed between the gas inlet line and the outlet line of the pressure tank. By using a differential pressure sensor between the gas inlet line and the outlet line of the pressure tank, the filling state height that varies during the filling can be taken into account, and the desired pressure value can be accordingly adjusted. Furthermore, the use of a differential pressure sensor enables an automatic indication when the filling process is concluded.

The object of the present invention is also realized by an apparatus for filling a pressure tank with fluid from a refill tank that is disposed higher, whereby the tanks are interconnected by a gas inlet line and a fluid feed line, according to which the apparatus is provided with a proportional valve in the gas inlet line to introduce a pressurized gas into the pressure tank, a first valve that is disposed between the proportional valve and the pressure tank, a second valve that is disposed between the proportional valve and the refill tank, and a third valve that is disposed in the fluid feed line. Such an apparatus again makes it possible to bring the pressure within the refill tank to the same pressure that exists in the pressure tank without thereby affecting the pressure in the pressure tank. Subsequently, a connection can be established between the refill tank and the pressure tank, so that the fluid that is in a refill tank can flow into the pressure tank due to a hydrostatic pressure difference, without altering the gas pressure ratios in the pressure tank.

Preferably provided in an outlet line of the pressure tank is a first pressure sensor, which is in communication with a control unit that with the aid of the measurement results of the pressure sensor determines a desired pressure value for the proportional valve. As already indicated previously, this enables an adaptation of the system to variable disturbance factors, such as tank filling state and filter pressure losses. The apparatus preferably has a second pressure sensor that is disposed in the gas inlet line in order to provide an actual pressure value for a regulation of the proportional valve, which value is not influenced by dynamic line and filter pressure losses.

The apparatus is preferably provided with a differential pressure sensor between the gas inlet line and the outlet line in order during the filling of the pressure tank with the fluid to enable an automatic adaptation of the system parameters to the changing tank filling height.

Pursuant to a further, preferred specific embodiment of the invention, the refill tank can be connected via coupling elements to the gas inlet line and to the fluid refill line. This makes it possible to fill the refill tank remote from the pressure tank, and in addition the refill tank can be used for the sequential filling of a plurality of pressure tanks. In this connection, the coupling elements are advantageously provided with sensors that provide an automatic indication when the coupling elements are closed. Pursuant to one specific embodiment of the present invention, the second and third valves can be automatically closed by release of the coupling elements in order not to adversely affect the system of the pressure tank in the event that the coupling elements are inadvertently released. The coupling elements are preferably quick or snap-type couplings.

BRIEF DESCRIPTION OF THE DRAWINGS

The present invention will be explained subsequently with the aid of a preferred specific embodiment with reference to the drawings; in the drawings.

DESCRIPTION OF PREFERRED EMBODIMENTS

Figure 1:
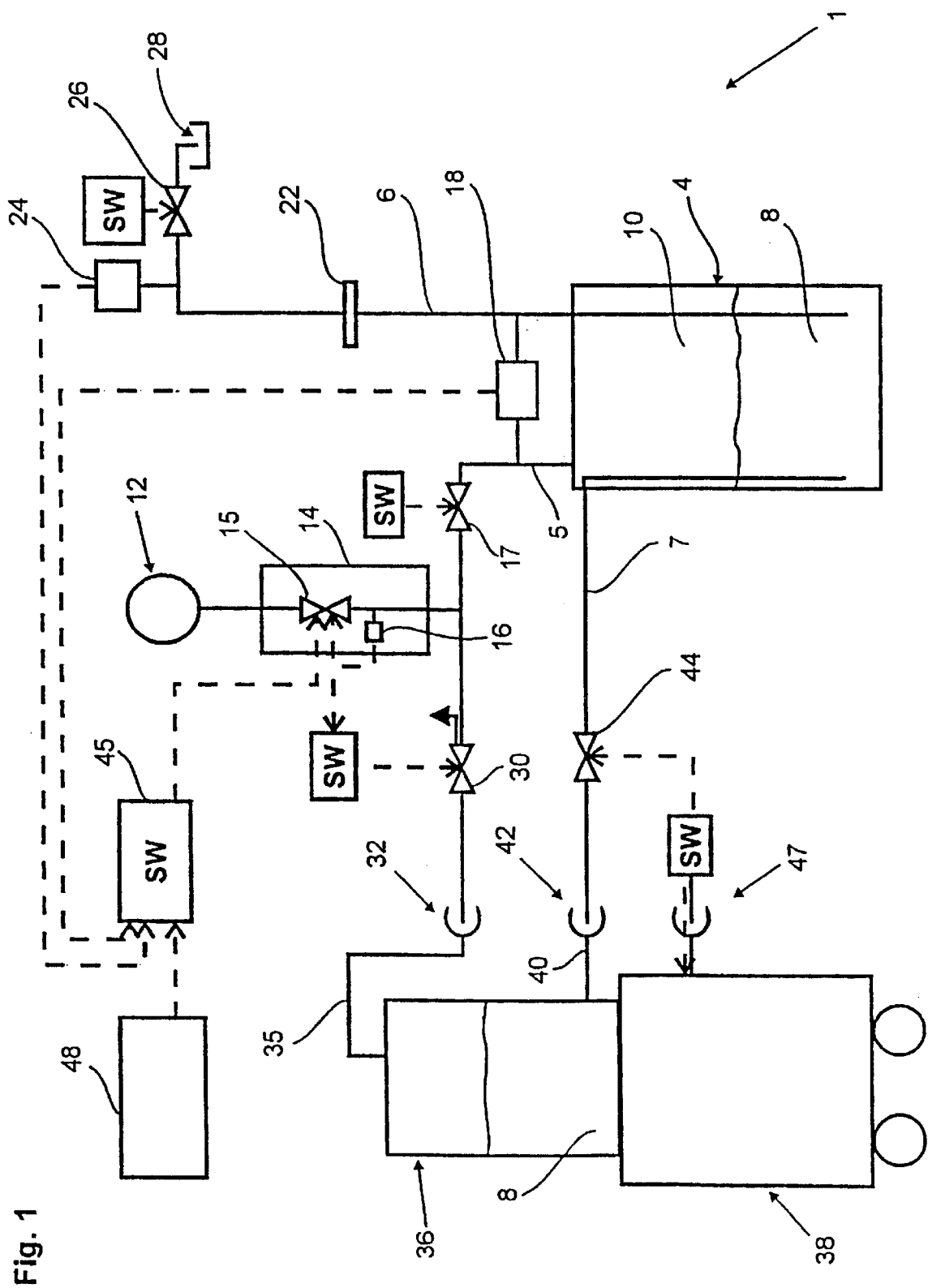
FIG. 1 shows an inventive apparatus for filling a pressure tank with a fluid.

FIG. 1 shows a lacquering or coating system 1 for CD's. The coating system 1 is provided with a pressure tank 4 having a gas inlet line 5, an outlet line 6, and a fluid feed line 7. The gas inlet line opens into an upper region of the pressure tank 4, while the outlet line 6 and the fluid feed line 7 extend into a lower region of the pressure tank and open into this region. The pressure tank 4 is partially filled with a lacquer or doping material 8 for coating the CD's. Due to the weight of the lacquer 8, it fills a lower portion of the pressure tank 4. In the region located above the lacquer, there is disposed a pressurized gas 10, such as nitrogen.

The pressure tank 4 is filled with the nitrogen 10 from a nitrogen supply 12 which communicates with the inlet line 5. A valve unit 14 having a proportional valve 15 and an internal pressure sensor 16, which is disposed between the proportional valve 15 and the pressure tank 4, is located in the inlet line 5 between the nitrogen supply 12 and the pressure tank 4.

A valve 17 for closing and opening the gas inlet line 5 is provided in such line between the valve unit 14 and the pressure tank 4.

A differential pressure sensor 18 is provided next to the upper side of the pressure tank 4 between the inlet line 5 and the outlet line 6, and is in a position to measure the pressure difference between the two lines.

Disposed in the outlet line 6, downstream from the differential pressure sensor 18, as viewed in the direction from the pressure tank 4, is a filter 22 as well as a pressure sensor 24 that is in communication with the outlet line 6, and an outlet or discharge valve 26. Downstream of the valve 26 (as seen from the pressure tank 4), the outlet line 6 opens into a coating station 28 in which CD's are supplied with the lacquer 8 when the valve 26 is opened.

Provided in the gas inlet line 5 is a further valve 30, which is embodied as a one/two way valve and which is not disposed in a direct connection between the valve unit 14 and the pressure tank 4. Rather, the valve 30 is disposed in a portion of the gas inlet line 5 that ends in a coupling element of a quick or snap-type coupling 32. The valve 30 is in a position either to connect the coupling end of the gas inlet line 5 with the valve unit or to terminate this connection and to connect the coupling end of the gas inlet line 5 with the atmosphere.

By means of the snap-type coupling 32, the gas inlet line can be coupled to a connecting line 35 which communicates with a refill tank 36. The refill tank 36 is filled with lacquer 8, and can be supplied with pressurized gas via the gas inlet line 5 and the connecting line 35, whereby the connecting line 35 opens into an upper region of the refill tank 36.

The pressure tank 36 is disposed on a rolling carriage 38, with which it can be transported. The refill tank 36 is disposed higher than the pressure tank 4.

The refill tank 36 is provided with a fluid outlet line 40 that ends in a coupling element of a quick or snap-type coupling 42, whereby the outlet line can be connected via the snap-type coupling 42 with an end of the fluid feed line 7 that is remote from the pressure tank 4. A valve 44 for opening and closing the fluid feed line 7 is provided therein between the snap-type coupling 42 and the pressure tank 4.

The coating system is provided with a control unit 45 that is connected to various components of the coating system and communicates with them. To simplify the illustration, a plurality of blocks are provided in FIG. 1 that are designated SW, each of which represents the control unit 45.

The rolling carriage 38 can be connected with the control unit 45 by means of a quick or snap-type coupling 47 in order to provide an indication when the refill tank is properly coupled to the coating system 1.

An input terminal 48 is provided for the control unit 45 in order to be able to input, for example, a desired pressure value.

The control unit 45 is connected to the internal pressure sensor 16 of the valve unit 14 and receives therefrom the pressure $p_{int}$ measured in the gas inlet line 5. From the differential pressure sensor basis of the measured pressure difference between the gas inlet line 5 and the outlet line 6. From the pressure sensor 24, the control unit 45 receives a pressure value $p_{ext}$ measured in the outlet line 6.

From the measured pressure values as well as from the desired pressure value prescribed via the input terminal 48, the control unit 45 determines a corrected desired pressure value $p_{soll,korr}$, which it conveys further to the proportional valve 15 of the valve unit 14 for regulating the pressure in the gas inlet line 5. The pressure $p_{int}$ measured in the gas inlet line 5 is also conveyed further from the pressure sensor 16 as an actual pressure to the proportional valve 15 for regulating the same.

The determination of the corrected desired pressure value $p_{soll,korr}$ is described in detail in applicant's application filed on the same day and having the title "Method and Apparatus for Dispensing a Fluid from a Pressure Tank". To avoid repetition, such application is incorporated by reference herein to the extent pertinent to the present subject matter.

By means of suitable connections, the control unit 45 controls the opening and closing of the valves 17, 26, 30, and 44.

Figure 2:
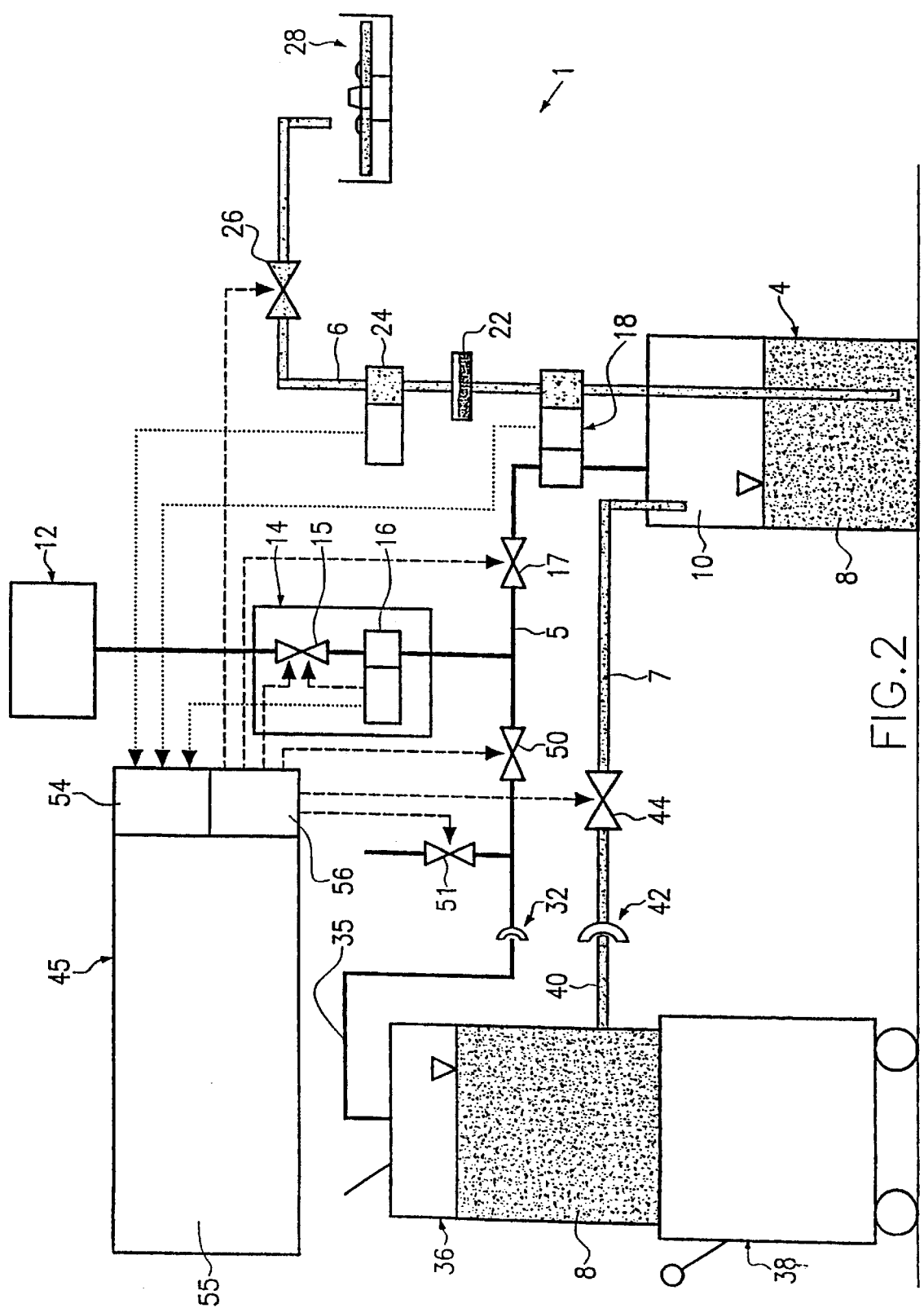
FIG. 2 shows an alternative form of the apparatus for filling the pressure tank with a fluid.

FIG. 2 similarly schematically shows a coating system 1 for CD's. In FIG. 2, the same reference numerals are used as in FIG. 1 to describe the same or equivalent components.

To avoid repetition, with reference to FIG. 2 only the differences between the two figures will be described.

Instead of a one/two way valve 30 as is provided in FIG. 1, in the system of FIG. 2, two separate valves 50,51 are used that are alternatingly switched in order to connect the coupling end portion of the gas inlet line 5, via the valve 50, with the remainder of the gas inlet line 5, or to vent the line to the atmosphere via the valve 51.

The control unit 45 has an input portion 45 into which pressure values of the internal pressure sensor 16 of the differential pressure sensor 18 and of the pressure sensor 24 are introduced. The control unit 45 is furthermore provided with a processing unit 55 in which various control parameters are calculated. By means of an output unit 56, the control unit 45 controls the opening and closing of the various valves 17, 26, 44, 50, and 51. In addition, a desired pressure value $p_{soll,korr}$ is prescribed via the control unit 45 to the valve unit 14, in particular to the proportional valve 15; the desired pressure value is determined with the aid of the introduced pressure values of the internal pressure sensor 16, of the differential pressure sensor 18 and of the pressure sensor 24.

Figure 3:
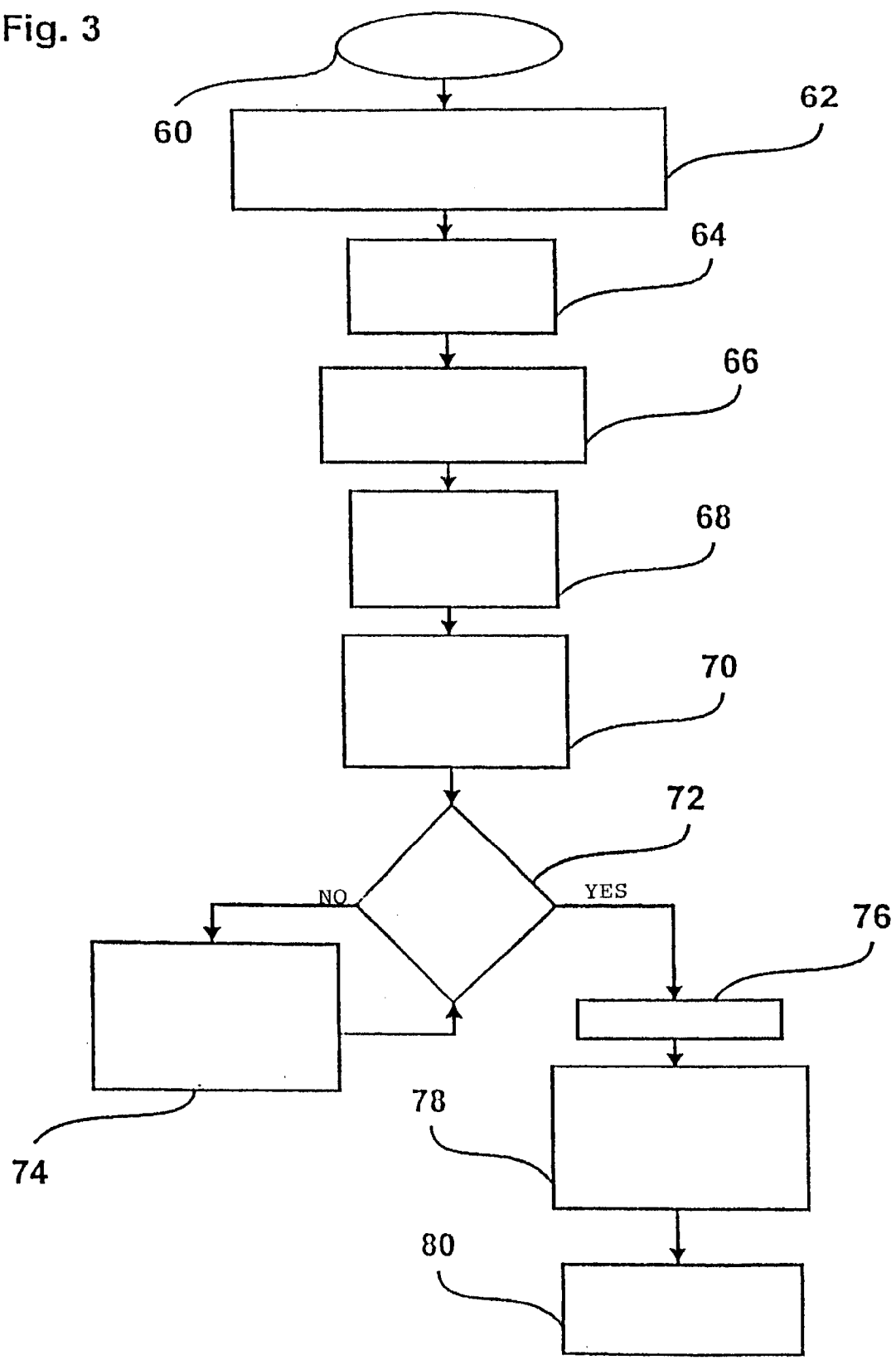
FIG. 3 shows a flow diagram for the operating sequence of a refilling process.

The operation of the coating system 1 will now described with the aid of the flow diagram of FIG. 3. In a starting position of the system illustrated by the block 60, the valve 44 is closed and the valve 30 to the atmosphere is opened, or the valve 50 is closed and the valve 51 is opened. The refill tank is not connected to the coating system 1. The valve 17 is opened, and a coating of the CD's located in the coating station 28 is effected by opening and closing the valve 26, whereby the lacquer disposed in the pressure tank 4 is pressed to the coating station 28 by the pressure in the pressure tank 4. With regard to the operating sequence of the coating, and the regulation of the pressure within the system, in order to avoid repetition reference is again made to the aforementioned application having the title "Method and Apparatus for Dispensing a Fluid from a Pressure Tank", which is incorporated by reference to the extend relevant to the subject matter of the present application.

If it is established that the level of the lacquer 8 in the pressure tank 4 has dropped to a level that requires a refilling of the lacquer 8, in block 62 a refill tank 36 that is filled with lacquer 8 is connected via the snap-type couplings 32,42 with the ends of the gas inlet line 5 and of the fluid feed line 7. In this connection, the snap-type couplings 32,42 are provided with variable capacitance sensors in order to immediately provide an indication and if necessary to provide a closing of the valves 30 or 50 and 44 in the event that the snap-type couplings have been inadvertently uncoupled.

Subsequently, in a block 64 the valve 17 is closed so that the pressure tank 4 is isolated relative to the valve unit 14. At the same time, within the control unit 45 the determination of the corrected desired pressure value $p_{soll,korr}$ is interrupted and the input terminal 48 is blocked in order to prevent an input of a changed desired pressure value. Despite the interrupted gas supply, the pressure is maintained in the pressure tank 4 without a readjustment being possible at this point in time. The coating processes of CDs in the coating station 28 are nonetheless continued, since the pressure in the pressure tank does not drop to a point to where readjustment would be required until after approximately fifty dispensing cycles.

In block 66, the valve 30 or the valve 50 is opened, and the valve 51 is closed in order to provide a connection between the valve unit 14 and the refill tank 36 via the gas inlet line 5 and the connecting line 35. Subsequently, the pressure in the refill tank 36 is adjusted to the last desired pressure value $p_{soll,korr}$ determined prior to closing of the valve 17.

When this pressure is reached, in block 68 the valve 17 is again opened. A simultaneous adjustment of the pressure in the pressure tank 4 and in the refill tank 36 is now effected via the valve unit 14. Minimal pressure differences that resulted due to the fact that no readjustment of the pressure in the pressure tank took place as long as the valve 17 was closed, are compensated for without adversely affecting the system. At this point in time, the determination of a corrected desired pressure value $p_{soll,korr}$ is again undertaken.

Subsequently, in block 70, the valve 44 in the fluid feed line 7 is opened. Due to the hydrostatic pressure difference between the lacquer 8 in the refill tank 36 and the lacquer 8 in the pressure tank 4, the lacquer flows from the refill tank 36 into the pressure tank 4. Due to the thereby changing filling height of the lacquer 8 in the pressure tank 4, the corrected desired pressure value is determined during this phase only as a function of the measurement results of the differential pressure sensor 18, since the latter is a sensitive indication for the changing tank filling height. Thus, the system can be adapted to the changing tank filling height.

In block 72, with the aid of measurement results form the differential pressure sensor 18, the conclusion of the filling process is determined. The end of the filling process is recognized in that the following equation is fulfilled:

$$d(p)/dt=0.$$

In other words, the change of the differential pressure at the differential pressure sensor becomes 0, which indicates that no more lacquer is being refilled and there is thus no longer any change in the filling state.

If it is determined that the conclusion of the tank filling has not yet been achieved, in block 74 the valve 44 is kept open and the corrected desired pressure value $p_{soll,korr}$ continues to be adapted via the differential pressure $\Delta p$. As long as the conclusion of the tank filling is not achieved, this state is maintained. In the event that the conclusion of the tank filling is not achieved in a specified period of time that is longer than the normal duration for a filling process, the system can provide a warning signal, thereby indicating a failure during the filling of the pressure tank 4.

If the conclusion of the tank filling is achieved within the time period, in a block 76 the valve 44 is closed. Subsequently, in the block 78, the valve 17 is first closed and then either the one/two way valve 30 (pursuant to FIG. 1) is set to a venting position, or (pursuant to FIG. 2) the valve 50 is closed and the valve 51 is opened. During this changeover, the valve 17 is to remain closed in order to isolate the pressure tank from pressure surges that might occur within the gas inlet line 5. It may be necessary after the changeover of the valve 30, or the valves 50 and 51, to readjust the pressure within the gas inlet line 5. The valve 17 is subsequently again opened, and the control unit 45 again changes to normal determination of the corrected desired value $p_{soll,korr}$.

The control unit 45 subsequently again changes to the normal determination of the corrected desired pressure value $p_{soll,korr}$.

Subsequently, the refill tank 36 is uncoupled in the block 80.

The invention has been described above with the aid of preferred specific embodiments without, however, being limited thereto. For example, it is not necessary to uncouple the refill tank 36; rather, it could also remain static and be permanently connected with the gas inlet line 5 or the fluid feed line 7.

The specification incorporates by reference the disclosure of German priority document 199 14 202.5 filed Mar. 29, 1999 and International priority document PCT/EP00/02156 of Mar. 11, 2000.

The present invention is, of course, in no way restricted to the specific disclosure of the specification and drawings, but also encompasses any modifications within the scope of the appended claims.

What is claimed is:

1. An apparatus for filling a pressure tank, which has an outlet line, said apparatus comprising:
    a refill tank that is disposed higher than said pressure tank and is connected with said pressure tank via a gas connecting line and a fluid feed line;
    a pressurized gas supply;
    a proportional valve, disposed in a gas inlet line that communicates with said gas connecting line, for introducing a pressurized gas from said pressurized gas supply into at least one of said pressure tank and/or into said refill tank;
    a first valve that is disposed between said proportional valve and said pressure tank but not in a connection between said proportional valve and said refill tank;
    a second valve that is disposed between said proportional valve and said refill tank but not in a connection between said proportional valve and said pressure tank; and
    a third valve, which is disposed in said fluid feed line.

2. An apparatus according to claim 1, wherein a first pressure sensor is disposed in said outlet line of said pressure tank, and wherein said first pressure sensor communicates with a control unit that determines a desired pressure value for said proportional valve with the aid of measurement results of said first pressure sensor.

3. An apparatus according to claim 2, wherein a second pressure sensor is disposed in said gas inlet line.

4. An apparatus according to claim 1, wherein a differential pressure sensor is disposed between said gas inlet line and said outlet line.

5. An apparatus according to claim 1, wherein said refill tank is connectable with said gas inlet line and said fluid feed line via coupling elements.

6. An apparatus according to claim 5, wherein said coupling elements are provided with sensors.

7. An apparatus according to claim 5, wherein said second and third valves are automatically closable by release of said coupling elements.

8. An apparatus according to claim 5, wherein said coupling elements are quick or snap-type couplings.

9. A method of filling a pressure tank, which is provided with an outlet line, with a fluid from a refill tank that is disposed higher than said pressure tank, wherein said pressure tank and said refill tank are interconnected via a gas connecting line and a fluid feed line, said method including the steps of:
    while said gas connecting line and said fluid feed line to said refill tank are closed, regulating said pressure in said pressure tank with a pressurized gas, from a pressurized gas supply, via a proportional valve disposed in a gas inlet line that communicates with said gas connecting line;
    closing said gas inlet line between said proportional valve and said pressure tank;
    regulating a pressure in said refill tank to said pressure in said pressure tank via said proportional valve; and
    opening said gas connecting line and said fluid feed line between said refill tank and said pressure tank.

10. A method according to claim 9, wherein said pressure in said pressure tank is regulated to a desired pressure value that is determined as a function of measurement results of a first pressure sensor that is disposed in said outlet line of said pressure tank.

11. A method according to claim 10, wherein said desired pressure value is not altered as long as said gas inlet line is closed between said proportional valve and said pressure tank.

12. A method according to claim 10, wherein as long as said connecting lines between said refill tank and said pressure tank are opened, said desired pressure value is determined as a function of said measurement results of a differential pressure sensor that is disposed between said gas inlet line and said outlet line of said pressure tank.

13. A method according to claim 9, which includes the step of measuring said pressure in said gas inlet line.

* * * * *